United States Patent
Höynälä

(10) Patent No.: US 11,382,186 B2
(45) Date of Patent: Jul. 5, 2022

(54) TOP HOOD AND A MEASUREMENT SYSTEM

(71) Applicant: WICIOT OY, Oulu (FI)

(72) Inventor: Marko Höynälä, Oulu (FI)

(73) Assignee: WICIOT OY, Oulu (FI)

( * ) Notice: Subject to any disclaimer, the term of this patent is extended or adjusted under 35 U.S.C. 154(b) by 479 days.

(21) Appl. No.: 16/465,700

(22) PCT Filed: Nov. 29, 2017

(86) PCT No.: PCT/FI2017/050840
§ 371 (c)(1),
(2) Date: May 31, 2019

(87) PCT Pub. No.: WO2018/100245
PCT Pub. Date: Jun. 7, 2018

(65) Prior Publication Data
US 2020/0029401 A1 Jan. 23, 2020

(30) Foreign Application Priority Data

Dec. 2, 2016 (FI) ...................................... 20165922

(51) Int. Cl.
*H05B 6/64* (2006.01)
*H05B 6/80* (2006.01)
*B65D 81/34* (2006.01)

(52) U.S. Cl.
CPC ......... *H05B 6/6408* (2013.01); *H05B 6/6455* (2013.01)

(58) Field of Classification Search
CPC ........ A47J 36/027; A47J 36/06; G01J 3/0264; G01J 3/42; G01J 5/0003; G01J 5/0044;
(Continued)

(56) References Cited

U.S. PATENT DOCUMENTS 4,297,557 A  10/1981  Tyler et al.
4,933,525 A  6/1990  St. Phillips
(Continued)

FOREIGN PATENT DOCUMENTS

CN  203163010  8/2013
CN  209574260 U * 11/2019
(Continued)

OTHER PUBLICATIONS

International Search Report for PCT/FI2017/050840 dated Mar. 1, 2018, 4 pages.
(Continued)

*Primary Examiner* — Quang T Van
(74) *Attorney, Agent, or Firm* — Nixon & Vanderhye PC

(57) ABSTRACT

A top hood for covering food in a microwave oven is provided. The top hood (H1) includes a microwave transparent wall structure including a side wall (SW) and top part (TP). The side wall (SW) and top part (TP) define the internal area (IA) covered by the top hood (H1). Attached to the wall structure of the top hood (H1), the top hood (H1) includes a temperature sensor (TS) for measuring the temperature within the internal area (IA) covered by the top hood (H1). The top hood further includes a wireless transmitter (WT) for transmitting the measured temperature information to an external display unit (DU).

17 Claims, 2 Drawing Sheets

(58) Field of Classification Search
CPC .... H05B 6/6408; H05B 6/645; H05B 6/6455; H05B 6/6467
USPC ....... 219/710, 745, 762, 732, 734, 756, 725, 219/733, 735, 759; 426/243, 234, 107; 220/364, 731, 367.1; 99/DIG. 14
See application file for complete search history.

(56) References Cited

U.S. PATENT DOCUMENTS

| | | | |
|---|---|---|---|
| 5,893,051 | A | 4/1999 | Tomohiro |
| 2008/0296303 | A1* | 12/2008 | Krent .................... A47J 37/101 220/370 |
| 2014/0251983 | A1 | 9/2014 | Farah |

FOREIGN PATENT DOCUMENTS

| | | | |
|---|---|---|---|
| CN | 210961604 U | * | 7/2020 |
| DE | 2719588 | | 11/1977 |
| EP | 0 917 402 | | 5/1999 |
| WO | 2016/162498 | | 10/2016 |

OTHER PUBLICATIONS

Written Opinion of the ISA for PCT/FI2017/050840 dated Mar. 1, 2018, 7 pages.
Search Report for FI20165922 dated Jun. 2, 2017, one (1) page.
Extended European Search Report dated Mar. 24, 2020 in corresponding European Application No. 17877030.1, 6 pages.

* cited by examiner

TOP HOOD AND A MEASUREMENT SYSTEM

This application is the U.S. national phase of International Application No. PCT/FI2017/050840 filed Nov. 29, 2017 which designated the U.S. and claims priority to FI Patent Application No. 20165922 filed Dec. 2, 2016, the entire contents of each of which are hereby incorporated by reference.

FIELD

The present invention relates to microwave hoods for covering the food to be heated in a microwave oven. The top hood is placed on top of the food inside the microwave oven. The present invention also relates to a measurement system.

Here, food is to be understood widely, including also liquids so not only food with solid form, and in addition to nutritive role, the role of the heated item can be refreshing.

A traditional microwave top hood comprise a plastic wall structure but nothing else, because the traditional top hood is purpose-built only to cover the item to be heated.

However, there has arisen a need to provide some information about the heating process/result done by the microwave oven. One previously known way is to integrate a sensor to the roof of the microwave oven or to the air canal within the casing of the microwave oven, but with that kind of structure one can detect only the air temperature within the microwave oven.

The current attempts to take care of the above mentioned need have not been good enough and especially they are not really suitable with microwave ovens.

BACKGROUND

Brief Description

An object of the present invention is to provide a new top hood and a measurement system, so as to solve or to alleviate the above disadvantages. The objects of the invention are achieved by a top hood and a measurement system which are characterized by what is stated in the independent claims. The preferred embodiments of the invention are disclosed in the dependent claims.

The invention is based on applying thermal sensor and a wireless transmitter to a top hood used in a microwave oven, said transmitter being coupled to send the temperature measurement info to a display.

An advantage of the invention is that it provides in an easy way a possibility to monitor the thermal radiation from the item to be heated, so as to find out the temperature of the item to be heated.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
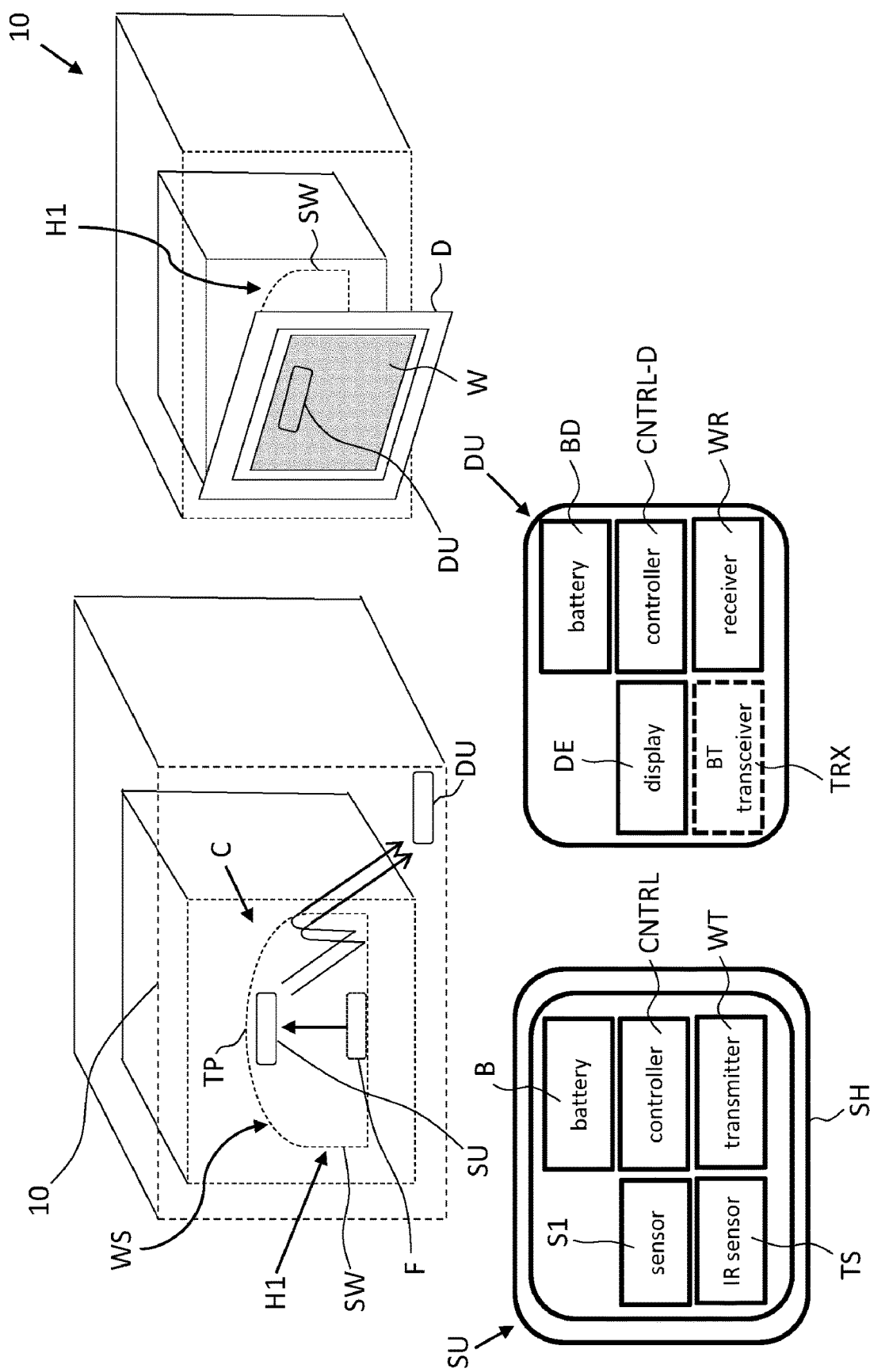
FIG. 1 is shows the first version of the invention
Figure 2:
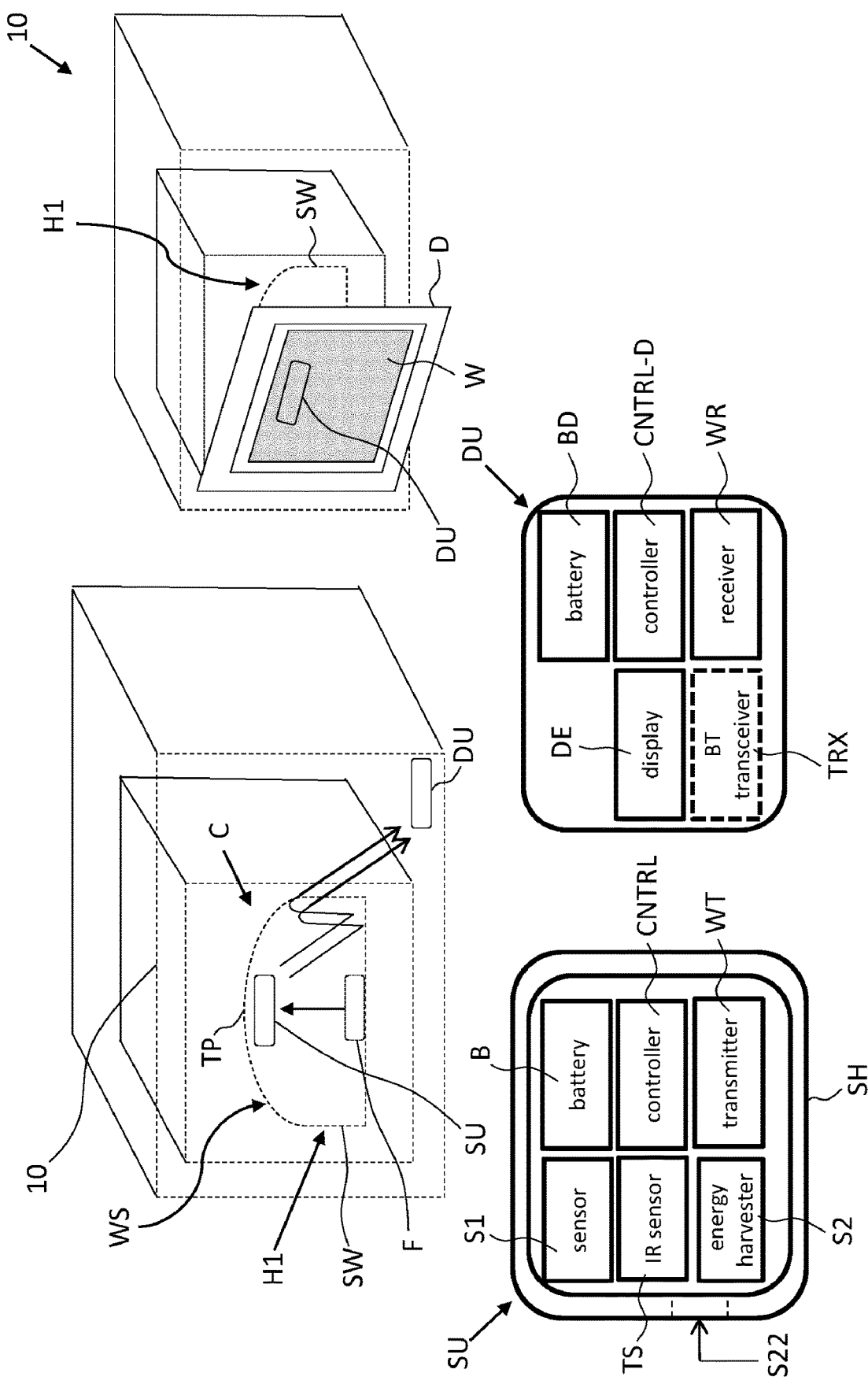
FIG. 2 shows a modified second version of the invention with a modified sensor unit with energy harvester (additional sensor).

Referring to FIGS. 1-2, there is shown a microwave oven 10, the power level of the microwave oven 10 can be 800 W-1200 W, for example. The microwave oven comprises a hinged door D and a chamber C behind the door D, the chamber C being intended for the food (solid, liquid) item/article to be warmed or heated.

Placeable inside the microwave oven 10, there is the main element of the invention, a top hood H1.

Top hood H1 can be made of thin walled plastic material, with a wall thickness on 0.5 mm-2 mm, for example.

The top hood H1 is for covering food F in a microwave oven 10. The top hood H1 comprises a microwave transparent wall structure WS comprising side wall SW and top part TP. The side wall SW and the top TP of the wall structure define an internal area IA covered by said top hood. Of course, the internal area IA is for the food. The food F is placed in normal way inside the oven to the chamber C, preferably on top of a rotating plate (not shown) and thereafter the top hood is place to cover the food F.

Referring to the invention, the top hood is such that attached to the wall structure of the top hood H1, the top hood H1 comprises a temperature sensor TS for measuring the temperature within the internal area IA covered by said top hood H1. So in practice the temperature sensor TS is measuring the temperature of the food F.

In an embodiment, one possible choice for the temperature sensor TS is a noncontact infrared temperature sensor from Excelitas Technologies Corp., that sensor type having a 100 ms response time.

Additionally. the top hood H1 further comprises a wireless transmitter WT for transmitting the measured temperature information to an external display unit DU. In an embodiment, the wireless transmitter WT is an optical transmitter, acoustic transmitter or a RF-transmitter. Regarding acoustic transmitter, the type of the acoustic transmitter can be audio or ultrasound.

As a one non-limiting example, the transmission frequency of the wireless transmitter WT can be around 800 MHz.

Referring to display unit DU, the display unit comprises, in addition to actual display element DE such as LCD-element, a battery BD, controller CNTRL-D, a wireless receiver WR. The controller CNTRL-D is arranged to control the operation of the display unit. The type of the wireless receiver is chosen to match with the wireless transmitter.

In an embodiment, controller CNTRL and CNTRL-D can be STM32 microcontrollers from STMicroelectronics.

Display unit DU can be located outside or inside the microwave oven 10. If inside, then due to visibility requirements of the display function, the display unit DU is located behind the at least partly transparent window W of the door D of the microwave oven.

If the display unit DU is outside the microwave oven 10, then the location of the display unit DU is not so critical, but especially when the wireless transmitter WT is an optical transmitter, then there should be optical path between the wireless transmitter WT in the sensor unit SU and the wireless receiver WR in the display unit. The optical path can direct or undirect. In the case of undirect path, the inner walls of the chamber C of the microwave oven 10 are typically reflective, so that optical signal transmitted from the wireless transmitter WT can be reflected from the inner wall before received by the wireless receiver WR.

Additionally the display unit DU may comprise a transceiver TRX such as BT-transceiver (Bluetooth, a low range RF-link). The transceiver TRX can communicate with a mobile device such a smart phone or tablet. An application in the mobile device can follow the temperature of the food F. The user can set a target temperature when the application alarms the user that the food has received the set temperature.

In the case the display unit DU is outside the microwave oven a widely used BT transceiver TRX can be used. In the case the display unit DU is inside the microwave oven 10 a similar transceiver method as described above (where the wireless transmitter WT is an optical transmitter, acoustic transmitter or a RF-transmitter) can be used. In that case it is obvious that wireless signal from the sensor unit SU can be detected by a mobile device which is designed or having an accessory unit capable to detect the wireless signal.

In an embodiment, the BT transceiver TRX can be of model nRF51822 from Nordic Semiconductor AS. Actually nRF51822 is a microcontroller with a built-in BT-feature.

As can been seen at the lower left hand corners of FIGS. 1-2, the temperature sensor TS and the wireless transmitter WT belong to a sensor unit SU. However, the sensor unit SU can also comprise other element such as a battery B, controller CNTRL, a first additional sensor S1 and a second additional sensor S2 which can also be called an energy harvester. Sensor S2 can be seen in FIG. 2.

Regarding the first additional sensor S1, and referring to above, in an embodiment the top hood H1 or the related sensor unit SU thereof comprises a sensor S1 for detecting when the microwave oven 10 is set on. In an embodiment, the sensor S1 for detecting when the microwave oven 10 is set on is a sound sensing sensor, an antenna or other sensor for sensing the presence of microwaves or a sensor for sensing the presence of light or a motion sensor for sensing that the hood H1 is moved (set over the food) or it sense that a hood H1 is rotating in the case the microwave oven has a rotating plate for food F.

The role of the sensor S1 is such that this sensor S1 for detecting when the microwave oven is set on is coupled to activate the sensor unit SU or the temperature sensor TS and the wireless transmitter WT comprised by the sensor unit SU. So sensor S1 output creates a triggering effect to start the operation of the temperature sensor TS and the wireless transmitter WT.

Regarding the second additional sensor S2, and referring to above, in an embodiment the top hood H1 or the related sensor unit SU thereof comprises a sensor S2 for empowering the sensor unit SU by creating energy from the microwave radiation. The energy harvested by the sensor S2 is arranged to be used for measuring and sending, and/or recharging battery B inside the sensor unit SU. Sensor unit SU can be called also a measuring unit.

Getting back to top hood H1 containing the sensor unit SU, the sensor unit SU is supported by the top part TP of the wall structure of the top hood H1.

Regarding the level of integration, there are two possibilities. In an embodiment the sensor unit SU is an non-integral detachable part of the top hood H1. So the sensor unit SU can be kind of an easily removable add-on unit. Alternatively, the sensor unit SU is an integral non-detachable part of the top hood and in that case the sensor unit SU may have been integrated to the top hood H1 when molding or otherwise manufacturing the top hood H1 from the plastic material.

In a further embodiment the top hood H1 or the sensor unit SU comprises a microwave-resistant shield SH for protecting the sensor unit SU from the microwave radiation. This is beneficial because then the measurement operation and the transmission is not interfered by the microwaves. Especially when the sensor unit SU is detachable from the hood H1, then the shield SH is comprised by the sensor unit SU itself.

Referring to preferred embodiments of the shield SH, the shield SH is a net made of conductive material. In an embodiment the material of the shield SH is steel or aluminium.

The design of the shield SH is such that it provides a pass band in a different frequency band than the microwave radiation frequency band. Therefore, and as a non-limiting example, the pass band can be at 800 MHz and the stop band (shielded band) is around 2.45 GHz.

The shield SH can be in the form of a cavity for the sensor unit SU. The shield SH may have an optical window or windows for optical signal sent by an optical wireless transmitter WT. The optical windows can be holes or transparent areas in the shield SH.

It is also possible that sensor unit SU has a special lightguide which conduits a light from the transmitter inside the shield to outside the shield. The lightguide can further conduit the light through the top of the top hood H1.

The shield SH may also have an acoustic window or windows for acoustic signal sent by an acoustic transmitter. The acoustic windows can be holes or thinner areas in the shield SH. The shield SH can be designed also so that it can pass acoustic signals without special windows.

In an embodiment, referring to location on temperature sensor, the temperature sensor TS extends at least partly to the internal area IA within the top hood H1, said internal area being defined by the side wall SW and top part TP of the top hood H1.

As a combination of two above mentioned preferred embodiments, a part of the shield SH comprises the sensor S22 for empowering the sensor unit SU. Sensor S22 can be a hole or an opening in the shield SH, the hole/opening being surrounded by edge in the shield SH.

In addition to top hood H1 for microwave oven, the invention can be also related to a measurement system. The key elements of the measurement system are the top hood H1 as discussed above and the display unit DU.

It will be obvious to a person skilled in the art that, as the technology advances, the inventive concept can be implemented in various ways. The invention and its embodiments are not limited to the examples described above but may vary within the scope of the claims.

The invention claimed is:

1. A top hood for covering food in a microwave oven, said top hood comprising a microwave transparent wall structure comprising a side wall and top part, said side wall and said top part defining the internal area covered by said top hood, wherein attached to the wall structure of the top hood, the top hood comprises a temperature sensor for measuring the temperature within the internal area covered by said top hood, and said top hood further comprises a wireless transmitter for transmitting the measured temperature information to an external display unit.

2. A top hood according to claim 1, wherein the temperature sensor and the wireless transmitter belong to a sensor unit.

3. A top hood according to claim 2, wherein the sensor unit is supported by the top part of the wall structure of the top hood.

4. A top hood according to claim 2, wherein the top hood or the sensor unit comprises a microwave-resistant shield for protecting the sensor unit from the microwave radiation.

5. A top hood according to claim 1, wherein the temperature sensor extends at least partly to the internal area within the top hood, said internal area being defined by the side wall and top part of the top hood.

6. A top hood according to claim 2, wherein the sensor unit is a non-integral detachable part of the top hood.

7. A top hood according to claim 2, wherein the sensor unit is an integral non-detachable part of the top hood.

8. A top hood according to claim 2, wherein the top hood or the sensor unit thereof comprises a sensor for empowering the sensor unit by creating energy from the microwave radiation.

9. A top hood according to claim 2, wherein the top hood or the sensor unit thereof comprises a sensor for detecting when the microwave oven is set on.

10. A top hood according to claim 1, wherein the temperature sensor is an infrared sensor.

11. A top hood according to claim 9, wherein the sensor for detecting when the microwave oven is set on is a sound sensing sensor, an antenna or other sensor for sensing the presence of microwaves or, a sensor for sensing the presence of light or a motion sensor.

12. A top hood according to claim 9, wherein the sensor for detecting when the microwave oven is set on is coupled to activate the sensor unit or the temperature sensor and the wireless transmitter comprised by the sensor unit.

13. A top hood according to claim 1, wherein the wireless transmitter is an optical transmitter, acoustic transmitter or a RF-transmitter.

14. A top hood according to claim 4, wherein part of the shield comprises the sensor for empowering the sensor unit.

15. A top hood according to claim 4, wherein the shield is a net made of conductive material.

16. A top hood according to claim 4, wherein the shield is arranged to provide a pass band in a different frequency band than the shielded microwave radiation frequency band.

17. A measurement system, wherein the measurement system comprises a top hood for covering food in a microwave oven, said top hood comprising a microwave transparent wall structure comprising a side wall and top part, said side wall and said top part defining the internal area covered by said top hood, wherein:
  the top hood is provided such that attached to the wall structure of the top hood, the top hood comprises a temperature sensor for measuring the temperature within the internal area covered by said top hood, and said top hood further comprises a wireless transmitter for transmitting the measured temperature information to display unit,
  the measurement system also comprises said display unit, said display unit comprising a wireless receiver arranged to receive.

\* \* \* \* \*